United States Patent
Leydier et al.

(10) Patent No.: US 11,760,410 B2
(45) Date of Patent: Sep. 19, 2023

(54) GRADUAL DETECTION OF THE APPEARANCE OF TORQUE STEER

(71) Applicant: JTEKT EUROPE, Irigny (FR)

(72) Inventors: Luc Leydier, Feyzin (FR); André Michelis, Chonas l'Amballan (FR)

(73) Assignee: JTEKT EUROPE, Irigny (FR)

( * ) Notice: Subject to any disclaimer, the term of this patent is extended or adjusted under 35 U.S.C. 154(b) by 395 days.

(21) Appl. No.: 17/259,994

(22) PCT Filed: Jul. 9, 2019

(86) PCT No.: PCT/FR2019/051698
§ 371 (c)(1),
(2) Date: Jan. 13, 2021

(87) PCT Pub. No.: WO2020/012106
PCT Pub. Date: Jan. 16, 2020

(65) Prior Publication Data
US 2021/0380163 A1    Dec. 9, 2021

(30) Foreign Application Priority Data
Jul. 13, 2018  (FR) ...................................... 18/56492

(51) Int. Cl.
*B62D 6/00*    (2006.01)
*B62D 5/04*    (2006.01)

(52) U.S. Cl.
CPC ........... *B62D 6/003* (2013.01); *B62D 5/0421* (2013.01)

(58) Field of Classification Search
CPC ......... B62D 6/001; B62D 6/003; B62D 6/008
See application file for complete search history.

(56) References Cited

U.S. PATENT DOCUMENTS

| | | | |
|---|---|---|---|
| 5,668,722 A * | 9/1997 | Kaufmann | B62D 5/0466 701/41 |
| 10,202,146 B2 * | 2/2019 | Endo | B62D 5/0463 |

(Continued)

FOREIGN PATENT DOCUMENTS

| | | |
|---|---|---|
| CN | 104843055 A | 8/2015 |
| DE | 10 2007 000 320 A1 | 12/2008 |

(Continued)

OTHER PUBLICATIONS

Sep. 22, 2022 English Translation of the Office Action issued in Chinese Patent Application No. 201980046998.X.

(Continued)

*Primary Examiner* — Nicholas Kiswanto
(74) *Attorney, Agent, or Firm* — Oliff PLC

(57) ABSTRACT

A method for the gradual activation and deactivation of a steering return function in a vehicle, the vehicle including at least two wheels, a steering wheel, an assist motor applying an assist torque to a steering rack, and a drive motor applying a wheel torque to the wheels, the method including a step of calculating an application gain including a first phase of determining a first gain dependent on the wheel torque of at least one of the two wheels, a step of estimating the assist torque associated with the return function, and a step of multiplying the assist torque associated with the return function and the application gain, wherein during the application gain calculation step the method also includes a second phase of determining a second gain dependent on the angle of the steering wheel and the difference in the rotation speeds of the at least two wheels.

11 Claims, 2 Drawing Sheets

(56) References Cited

U.S. PATENT DOCUMENTS

| | | | |
|---|---|---|---|
| 2002/0125063 A1* | 9/2002 | Kurishige | B62D 5/0466 |
| | | | 180/443 |
| 2007/0294008 A1 | 12/2007 | Yasui et al. | |
| 2010/0087989 A1* | 4/2010 | Yamanaka | B62D 6/003 |
| | | | 701/41 |
| 2016/0001811 A1* | 1/2016 | Endo | B62D 6/10 |
| | | | 701/41 |
| 2019/0337565 A1* | 11/2019 | Kojima | G01L 5/221 |
| 2020/0361530 A1* | 11/2020 | Polmans | B62D 6/10 |

FOREIGN PATENT DOCUMENTS

| | | |
|---|---|---|
| EP | 2 907 729 A2 | 8/2015 |
| JP | 2006-213085 A | 8/2006 |
| JP | 2007-076579 A | 3/2007 |
| JP | 2008-126808 A | 6/2008 |
| JP | 2011-051394 A | 3/2011 |

OTHER PUBLICATIONS

Dec. 19, 2019 International Search Report issued in International Patent Application No. PCT/FR2019/051698.
Dec. 19, 2019 Written Opinion of the International Searching Authority issued in International Patent Application No. PCT/FR2019/051698.

\* cited by examiner

GRADUAL DETECTION OF THE APPEARANCE OF TORQUE STEER

The invention concerns the field of power steering systems and more particularly a method for gradually activating and deactivating a steering return function in a vehicle A motor vehicle generally includes a steering system allowing a driver to modify a trajectory followed by the vehicle. To do this, the driver changes an angle of a steering wheel. The steering wheel is connected to a steering column, itself linked to a rack transforming the angle of the steering wheel into a translational movement making it possible to modify the orientation of the steered wheels of the vehicle, and thus perform a right bend or a left bend. When the steering wheel angle is substantially zero, the steered wheels are substantially aligned with an axis of elongation of the vehicle and the vehicle follows a straight line trajectory. By convention in the remainder of the document, when the angle of the steering wheel becomes negative, the steered wheels form a negative angle with the axis of elongation of the vehicle and the vehicle makes a left bend. Conversely, when the steering wheel angle becomes positive, the steered wheels form a positive angle with the vehicle elongation axis and the vehicle makes a right bend. The driver is helped in the modification of the trajectory by an assist motor which delivers an assist torque on the rack, thus facilitating the orientation of the steering wheel.

The steered wheels, typically comprising a left wheel and a right wheel respectively positioned to the left and to the right of the vehicle in the direction of travel, can also be drive wheels, that is to say arranged to transmit to a road surface all or part of a drive torque delivered by an engine of the vehicle in order to propel said vehicle. Hereinafter, the term wheel designates a steered and drive wheel.

Each wheel is subjected, on the one hand to part of the drive torque and, on the other hand, to frictional forces linked to the followed trajectory and to the road surface. Thus, the forces exerted on a wheel can vary from wheel to wheel.

It has long been known to equip each wheel with a differential allowing to exert a different fraction of the drive torque on the right wheel and on the left wheel so that the right wheel turns at a different speed from the left wheel, in particular during a bend. Hereafter, the fraction of the drive torque received by said wheel will be called «wheel torque».

A well-known drawback of the differential is that, in the event of loss of grip, that is to say of slipping, of one of the wheels, the driving torque is totally transferred to this wheel, which therefore tends to get carried away, while the other wheel loses its drive capacity.

To remedy this drawback, there are limited slip differentials, or «self-locking differentials». The limited slip differential is intended to improve the traction of the vehicle by transferring the driving torque to the wheel with the lowest rotational speed, that is to say the wheel positioned inside a bend when the vehicle makes a turn, or to both wheels if they have the same rotational speed or to the wheel positioned outside the bend if the inside wheel slips.

For example, when the vehicle is turned to the left, that is to say when the left wheel is positioned inside the bend, the left wheel goes slower than the right wheel, so it is the left wheel which receives the driving torque. If the left wheel slips, its speed increases until it reaches the speed of the right wheel. The driving torque is then transferred to the right wheel causing a torque steer phenomenon, that is to say a phenomenon of self-steering to the right.

The torque steer phenomenon also appears when the vehicle performs a straight line trajectory and the wheels have a different grip on the road surface.

In order to compensate for said torque steer phenomenon, also called «torque steer», automobile manufacturers integrate a compensation function, also called «steering return function», making it possible, via the assist motor, to compensate for the deviation of the angle of the steering wheel imposed by the torque steer phenomenon. This function has the disadvantage of causing an unnatural feeling of the vehicle behavior to the driver when applied in the absence of the torque steer phenomenon.

There is a known solution making it possible to detect the appearance of the torque steer phenomenon by making a comparison of at least one torque at the wheel with a threshold value and thus to activate and deactivate the return function.

This solution therefore proposes a state machine that fully activates or deactivates the return function, causing the driver, at the time of activation and deactivation, to experience unnatural behavior of the vehicle.

The object of the invention is to remedy all or part of the aforementioned drawbacks by proposing a method for gradually activating and deactivating a steering return function in a vehicle, said vehicle comprising, at least two wheels, a steering wheel, an assist motor applying an assist torque to a steering rack and a driving motor applying a wheel torque on the at least two wheels, said method comprising a step of calculating an application gain including a first phase of determining a first gain dependent on the wheel torque of at least one of the two wheels, a step of estimating the assist torque associated with the return function, and a step of multiplying the assist torque associated with the return function and the application gain, characterized in that the method also includes during the step of calculating the application gain, a second phase of determining a second gain depending on, an angle of the steering wheel, and a difference in the rotational speeds of the at least two wheels.

The method according to the invention allows a progressive application of the steering return function on the steering system only when a torque steer phenomenon occurs. Thus, the method makes a continuous transition between a state in which the return function is completely active and a state in which the return function is inactive. In this way, a driver does not feel the activation or deactivation of the return function.

The progressive application is obtained by calculating an application gain comprising a first gain and a second gain, each gain being dependent on the parameters of the vehicle. The application gain varies continuously.

The first gain is represented by a two-dimensional graph with the x-axis representing the torque to at least one wheel and the y-axis representing the first gain. The first gain represents an intensity of the torque steer phenomenon.

The second gain represents a probability of being in a traffic situation that could lead to the appearance of the torque steer phenomenon.

Said application gain is then multiplied by the assist torque associated with the return function to determine a weighted return torque applied to a vehicle rack by the assist motor.

According to a characteristic of the invention, the second phase of determination depends on the angle of the steering wheel multiplied by the sign of a difference in the rotational speeds of the at least two wheels.

According to a characteristic of the invention, the second phase of determination depends on an absolute value of the difference in the rotational speeds of the at least two wheels.

Thus, the second gain is represented by a three-dimensional graph.

According to a characteristic of the invention, the second gain is comprised between 0 and 1.

According to a characteristic of the invention, the first gain is comprised between 0 and 1.

According to a characteristic of the invention, the step of calculating the application gain consists in multiplying the first gain and the second gain.

Thus, when one of, the first gain or the second gain, has a value of 0, the application gain is zero and therefore the weighted return torque is zero, that is to say that a torque steer phenomenon is not detected, and when the first gain and the second gain have a value of 1, the weighted return torque is maximum, that is to say a torque steer phenomenon is applied on the vehicle.

According to a characteristic of the invention, the wheel torque is determined as a function of the rotational speed of at least one of the two wheels, an engine speed and a driving torque supplied by the driving engine.

The number of rotations performed by the driving motor per unit of time is called engine speed.

According to a characteristic of the invention, the method comprises a step of evaluating a compensation gain depending on a lateral acceleration, a longitudinal acceleration of the vehicle, a yaw rate and the angle of the steering wheel.

The lateral acceleration corresponds to the second derivative with respect to time of the instantaneous position of the vehicle along an axis transverse to the axis of elongation of the vehicle, that is to say the vehicle acceleration when the latter performs a bend trajectory.

The longitudinal acceleration corresponds to the second derivative with respect to time of the instantaneous position of the vehicle along the axis of elongation of the vehicle, that is to say the vehicle acceleration when the latter performs a straight line trajectory.

The yaw rate corresponds to the speed of a rotational movement of the vehicle about a vertical axis.

The compensation gain is a gain comprised between 0 and 1. It is multiplied by the application gain and the assist torque associated with the return function in the multiplication step.

The compensation gain modulates the application of the return function according to a dynamic situation of the vehicle, that is to say an understeering or oversteering situation. This takes into account the conditions of the vehicle grip on the road surface.

For example, when the vehicle performs a straight line trajectory on a low-grip road surface such as ice, the wheels do not grip properly on the road surface. In this situation, the driving torque is high but the longitudinal acceleration is low. The torque steer phenomenon is unlikely to occur, so the compensation gain is low.

If the road surface has high grip, such as asphalt, the wheels grip strongly on the road surface. When the vehicle makes a straight line trajectory on such a road surface, the longitudinal acceleration is important. It is probable that the torque steer phenomenon appears, so the compensation gain is close to or equal to 1.

According to a characteristic of the invention, the step of evaluating the compensation gain comprises a third phase of determining a third gain depending on the lateral acceleration, a fourth phase of determining a fourth gain depending on the longitudinal acceleration, and a fifth phase of determining a fifth gain dependent on the absolute value of the yaw rate, or a theoretical angle calculated from the yaw rate and a vehicle speed, or a theoretical lateral acceleration calculated from the yaw rate and the vehicle speed, and the steering wheel angle or a theoretical yaw rate calculated from the angle of the steering wheel and the vehicle speed.

The third gain is represented by a two-dimensional graph with the x-axis representing the lateral acceleration and the y-axis representing the third gain.

The fourth gain is represented by a two-dimensional graph with the x-axis representing the longitudinal acceleration and the y-axis representing the fourth gain.

The fifth determination phase checks for consistency between the angle of the steering wheel and the yaw rate.

According to a characteristic of the invention, the fifth gain depends on the angle of the steering wheel multiplied by the sign of the yaw rate, or on a theoretical yaw rate multiplied by the sign of the yaw rate calculated from the angle of the steering wheel and the vehicle speed.

Thus, the fifth gain is represented by a three-dimensional graph.

The invention also relates to a power steering device of a vehicle comprising at least two wheels, a steering wheel, an assist motor applying an assist torque to a rack, a driving motor applying a wheel torque on the at least two wheels and implementing a method for gradually activating and deactivating a steering return function in a vehicle according to the invention.

The invention will be better understood, thanks to the description below, which relates to an embodiment according to the present invention, given by way of non-limiting example and explained with reference to the accompanying schematic drawings, in which.

In the remainder of the description, a vehicle is considered comprising a steering wheel allowing a driver to modify a trajectory followed by the vehicle as a function of an angle of the steering wheel $\alpha_D$. The steering wheel is connected to a steering column, itself linked to a rack transforming the angle of the steering wheel $\alpha_D$ into a translational movement making it possible to modify the orientation of two steered and drive wheels of the vehicle, and thus perform a right bend or a left bend.

The driver is assisted in his intention to change the angle of the steering wheel $\alpha_D$ by an assist motor applying an assist torque on the steering rack.

Figure 1:
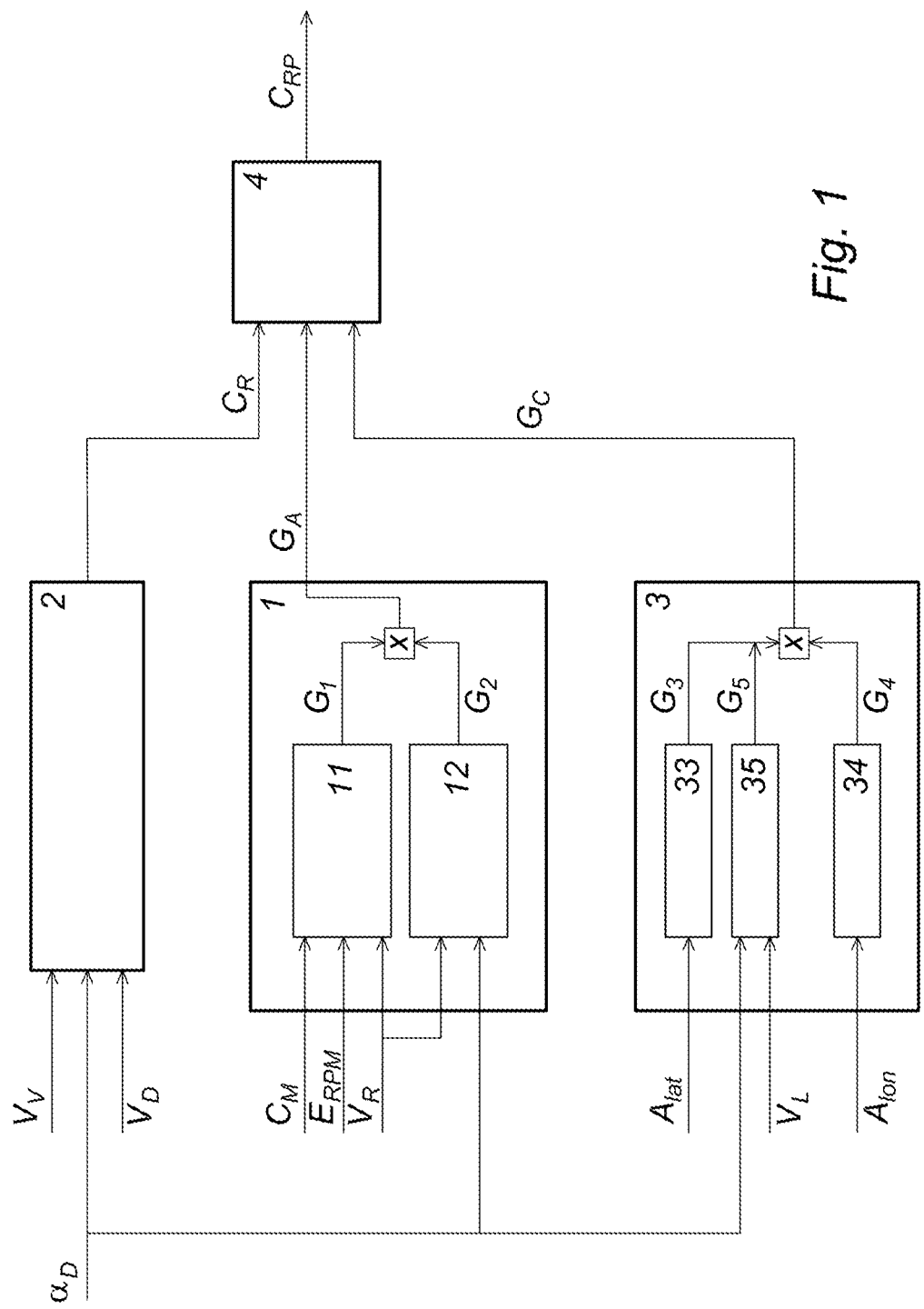
FIG. 1 is a schematic representation of the steps of a method according to the invention

FIG. 1 illustrates a method, according to the invention, for gradually activating and deactivating a steering return function in a vehicle.

The return function makes it possible to apply an assist torque $C_R$ so as to compensate for a deviation of the angle of the steering wheel $\alpha_D$ imposed by a torque steer phenomenon which appears in certain travel situations of the vehicle.

The return function determines during a estimation step 2 of the assist torque associated with the return function $C_R$, the assist torque $C_R$ making it possible to compensate for the deviation of the angle of the steering wheel $\alpha_D$ imposed by the torque steer phenomenon. The estimation step 2 receives as input a vehicle speed $V_V$, the angle of the steering wheel $\alpha_D$, and a rotational speed $V_D$ of the steering wheel.

Furthermore, the method determines an application gain $G_A$ during a step 1 of calculating the application gain $G_A$ comprising a first phase 11 of determining a first gain $G_1$ and a second phase 12 of determining a second gain $G_2$.

The first phase 11 receives as input a driving torque $C_M$ supplied by a driving motor of the vehicle making it possible to propel the vehicle, an engine speed $E_{RPM}$, that is to say the number of rotations performed by the driving motor per unit of time, and the rotational speed $V_R$ of the two wheels. The first phase 11 thus determines the first gain $G_1$ which is represented by a two-dimensional graph with on the x-axis a wheel torque, that is to say the fraction of the driving torque $C_M$ received by the wheel, and on the y-axis, the first gain $G_1$. The first gain $G_1$ represents an intensity of the torque steer phenomenon. It is comprised between 0 and 1.

Figure 2:
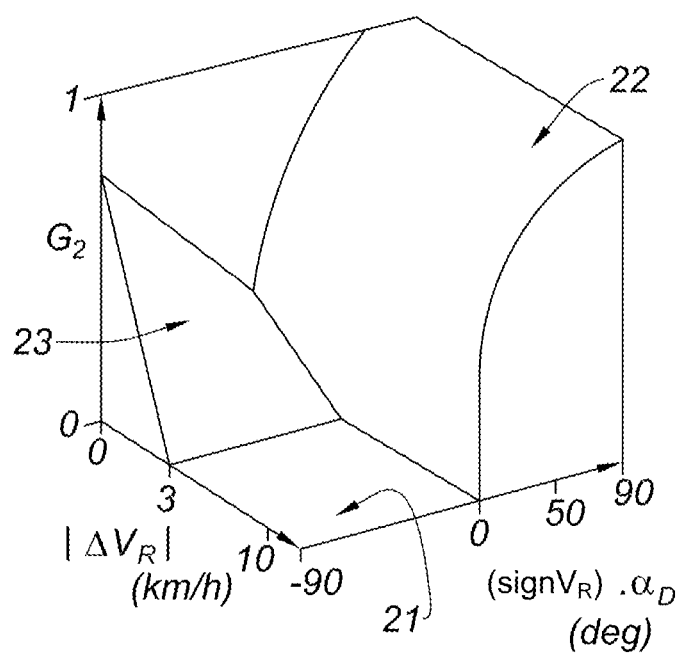
FIG. 2 is a three-dimensional graph representing a second gain according to the invention as a function of an angle of the steering wheel multiplied by the sign of a difference in the rotational speeds of two wheels of the vehicle and an absolute value of the difference in rotational speeds of the two wheels.

The second phase 12 receives as input the rotational speed $V_R$ of the two wheels and the angle of the steering wheel $\alpha_D$. The second phase 12 thus determines the second gain $G_2$ which is represented by a three-dimensional graph, as illustrated in FIG. 2, comprising on an x-axis, an absolute value of the difference of the rotational speeds $|\Delta V_R|$ of the two wheels in kilometers per hour km/h, and on a dimension axis the angle of the steering wheel $\alpha_D$ multiplied by the sign of a difference in the rotational speeds of the two wheels (sign$\Delta V_R$), which will hereinafter be called the angle of the signed steering wheel $\alpha_D$, in degrees deg.

More precisely, the second gain $G_2$ has, in a first zone 21, a value substantially equal to 0 when the vehicle is in a travel situation in which there is no risk of the appearance of torque steer phenomenon.

Thus, it is determined that when the difference in the rotational speed $\Delta V_R$ between the wheels is important (greater than 3 km/h) and the angle of the signed steering wheel $\alpha_D$ is negative, there is no risk of appearance of the phenomenon of pulling torque. This first zone 21 represents a travel situation in which the vehicle makes a bend in one direction, for example a left bend in a travel direction of the vehicle, with the left wheel which has a rotational speed $V_R$ greater than the right wheel. Indeed, the transfer of the driving torque $C_M$ on the wheel having the lowest rotational speed $V_R$, that is to say the right wheel in our example, will promote the bend to the left of the vehicle.

The second gain $G_2$ has, in a second zone 22, a value substantially equal to 0 when the angle of the signed steering wheel $\alpha_D$ is substantially equal to 0 and has a value substantially equal to 1 when the angle of the signed steering wheel $\alpha_D$ is substantially equal to 1. In the second zone 22, the second gain $G_2$ increases continuously. The second zone 22 represents the vehicle travel situations in which there is a risk of the appearance of the torque steer phenomenon. Indeed, the more the angle of the signed steering wheel $\alpha_D$ increases, that is to say the more the vehicle makes a curved trajectory, the more the risk of the appearance of the torque steer phenomenon is important.

Furthermore, in a third zone 23, the second gain $G_2$ has a value substantially equal to 0 when the difference in the rotational speed $\Delta V_R$ between the wheels is small (less than 3 km/h) and the angle of the signed steering wheel $\alpha_D$ is negative, and has an increasing value up to 0.8 when the difference in the rotational speed $\Delta V_R$ between the wheels is equal to 0 km/h and the signed steering wheel angle $\alpha_D$ is equal to −90°. The third zone 23 represents the vehicle traffic situations in which there is an average risk of the appearance of the torque steer phenomenon. In fact, the smaller the difference in speed between the wheels, the more the torque steer phenomenon can appear.

The second gain $G_2$, varying between 0 and 1, represents a probability of being in a traffic situation that could lead to the appearance of the torque steer phenomenon.

The calculation step 1 of the application gain $G_A$ consists of multiplying the first gain $G_1$ and the second gain $G_2$.

Thus, when the first gain $G_1$ and/or the second gain $G_2$ has a value of 0, the application gain $G_A$ is zero, that is to say that a torque steer phenomenon is not detected, and when the first gain $G_1$ and the second gain $G_2$ have a value of 1, the application gain $G_A$ is equal to 1, that is to say that the torque steer phenomenon is applied on the vehicle.

The method also determines a compensation gain $G_C$ during a step 3 of evaluating a compensation gain $G_C$ comprising a third phase of determining 33 a third gain $G_3$, a fourth phase of determining 34 a fourth gain $G_4$ and a fifth phase 35 of determining a fifth gain $G_5$.

The third phase 33 receives as input a value of the lateral acceleration $A_{lat}$ of the vehicle. The third phase 33 thus determines the third gain $G_3$ which is represented by a two-dimensional graph with on the x-axis, the lateral acceleration $A_{lat}$ and on the y-axis, the third gain $G_3$ which varies between 0 and 1.

The lateral acceleration corresponds to the vehicle acceleration when it makes a trajectory in a bend.

The fourth phase 34 receives as input a value of the longitudinal acceleration $A_{lon}$ of the vehicle. The fourth phase 34 thus determines the fourth gain $G_4$ which is represented by a two-dimensional graph with on the x-axis, the longitudinal acceleration $A_{lon}$ and on the y-axis, the fourth gain $G_4$ which varies between 0 and 1.

The longitudinal acceleration $A_{lon}$ corresponds to the vehicle acceleration when it performs a straight line trajectory.

Figure 3:
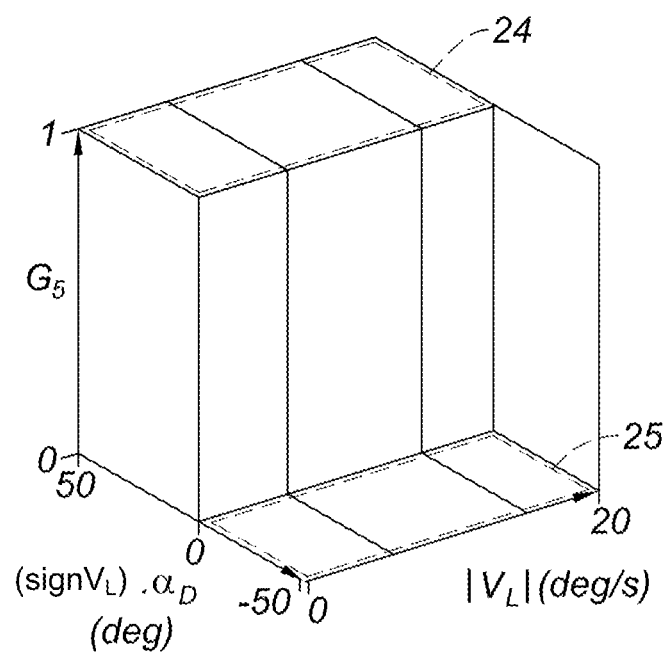
FIG. 3 is a three-dimensional graph representing a fifth gain according to the invention as a function of the steering wheel angle multiplied by the sign of a vehicle yaw rate and the absolute value of the yaw rate.

The fifth phase 35 receives as input the angle of the steering wheel $\alpha_D$ and a yaw rate $V_L$ of the vehicle. The fifth phase 35 thus determines the fifth gain $G_5$ which is represented by a three-dimensional graph, as illustrated in FIG. 3, comprising on an x-axis the angle of the steering wheel $\alpha_D$ multiplied by the sign of the yaw rate, which will be called the angle of the signed steering wheel $\alpha_D$ and on a dimension axis the absolute value of the vehicle yaw rate $|V_L|$. The yaw rate $V_L$ corresponds to the speed of a rotational movement of the vehicle about a vertical axis.

More precisely, the fifth gain $G_5$ has, in a first zone 24, a value substantially equal to 1 when the angle of the signed steering wheel $\alpha_D$ is negative and has, in a second zone 25, a value substantially equal to 0 when the angle of the signed steering wheel $\alpha_D$ is positive.

The fifth gain $G_5$ illustrates a consistency between the angle of the steering wheel $\alpha_D$ and the yaw rate $V_L$.

The compensation gain $G_C$ is the multiplication of the third gain $G_3$, the fourth gain $G_4$ and the fifth gain $G_5$. The compensation gain $G_C$ is comprised between 0 and 1.

During a multiplication step 4, the assist torque associated with the return function $C_R$ is multiplied with the application gain $G_A$ and the compensation gain $G_C$ so as to obtain a weighted return torque $C_{RP}$.

Thus, the application gain $G_A$ modulates the application of the return function as a function of the intensity of the torque steer phenomenon applied to the vehicle and the compensation gain $G_C$ modulates the application of the return function as a function of a dynamic situation of the vehicle, that is to say an understeering, or oversteering situation so as to take into account the conditions of the vehicle grip on the road surface.

The weighted return torque $C_{RP}$ allows a progressive application of the steering return function on the steering system only when a torque steer phenomenon occurs. Thus, the method performs a continuous transition between a state in which the return function is completely active, that is to say when the application gain $G_A$ and the compensation gain $G_C$ are equal to 1, and a state in which the return function is inactive, that is to say when the application gain $G_A$ and/or the compensation gain $G_C$ are equal to 0. In this way, a driver does not feel the activation or deactivation of the return function.

Of course, the invention is not limited to the embodiment described and represented in the accompanying figures. Modifications remain possible, in particular from the point of view of the constitution of the various elements or by substitution of technical equivalents, without departing from the scope of protection of the invention.

The invention claimed is:

1. A method for gradually activating and deactivating a steering return function in a vehicle, the vehicle comprising, at least two wheels, a steering wheel, an assist motor applying an assist torque to a steering rack and a driving motor applying a wheel torque on the at least two wheels, the method comprising a step of calculating an application gain including a first phase of determining a first gain depending on the wheel torque of at least one of the two wheels, a step of estimating the assist torque associated with the return function, and a step of multiplying the assist torque associated with the return function and the application gain, wherein the method also includes during the calculation step of the application gain, a second phase of determining a second gain depending on an angle of the steering wheel, and a difference in the rotational speeds of the at least two wheels.

2. The method according to claim 1, wherein the second phase of determination depends on the angle of the steering wheel multiplied by the sign of a difference in the rotational speeds of the at least two wheels.

3. The method according to claim 1, wherein the second phase of determination depends on an absolute value of the difference in rotational speeds of the at least two wheels.

4. The method according to claim 1, wherein the second gain is comprised between 0 and 1.

5. The method according to claim 1, wherein the first gain is comprised between 0 and 1.

6. The method according to claim 1, wherein the step of calculating the application gain consists of multiplying the first gain and the second gain.

7. The method according to claim 1, wherein the wheel torque is determined as a function of the rotational speed of at least one of the two wheels, an engine speed and a driving torque supplied by the driving motor.

8. The method according to claim 1, comprising a step of evaluating a compensation gain depending on a lateral acceleration, a longitudinal acceleration of the vehicle, a yaw rate and the angle of the steering wheel.

9. The method according to claim 8, wherein the step of evaluating the compensation gain comprises a third phase of determining a third gain depending on the lateral acceleration, a fourth phase of determining a fourth gain depending on the longitudinal acceleration, and a fifth phase of determining a fifth gain depending on the absolute value of the yaw rate, or a theoretical angle calculated from the yaw rate and a vehicle speed, or a theoretical lateral acceleration calculated from the yaw rate and vehicle speed, and the angle of the steering wheel or a theoretical yaw rate calculated from the angle of the steering wheel and vehicle speed.

10. The method according to claim 9, wherein the fifth gain depends on the angle of the steering wheel multiplied by the sign of the yaw rate, or a theoretical yaw rate multiplied by the sign of the yaw rate calculated from the angle of the steering wheel and the vehicle speed.

11. A power steering device of a vehicle comprising at least two wheels, a steering wheel, an assist motor applying an assist torque on a rack, a driving motor applying a wheel torque on the at least two wheels and implementing a method for progressively activating and deactivating a steering return function in a vehicle according to claim 1.

* * * * *